No. 747,343.

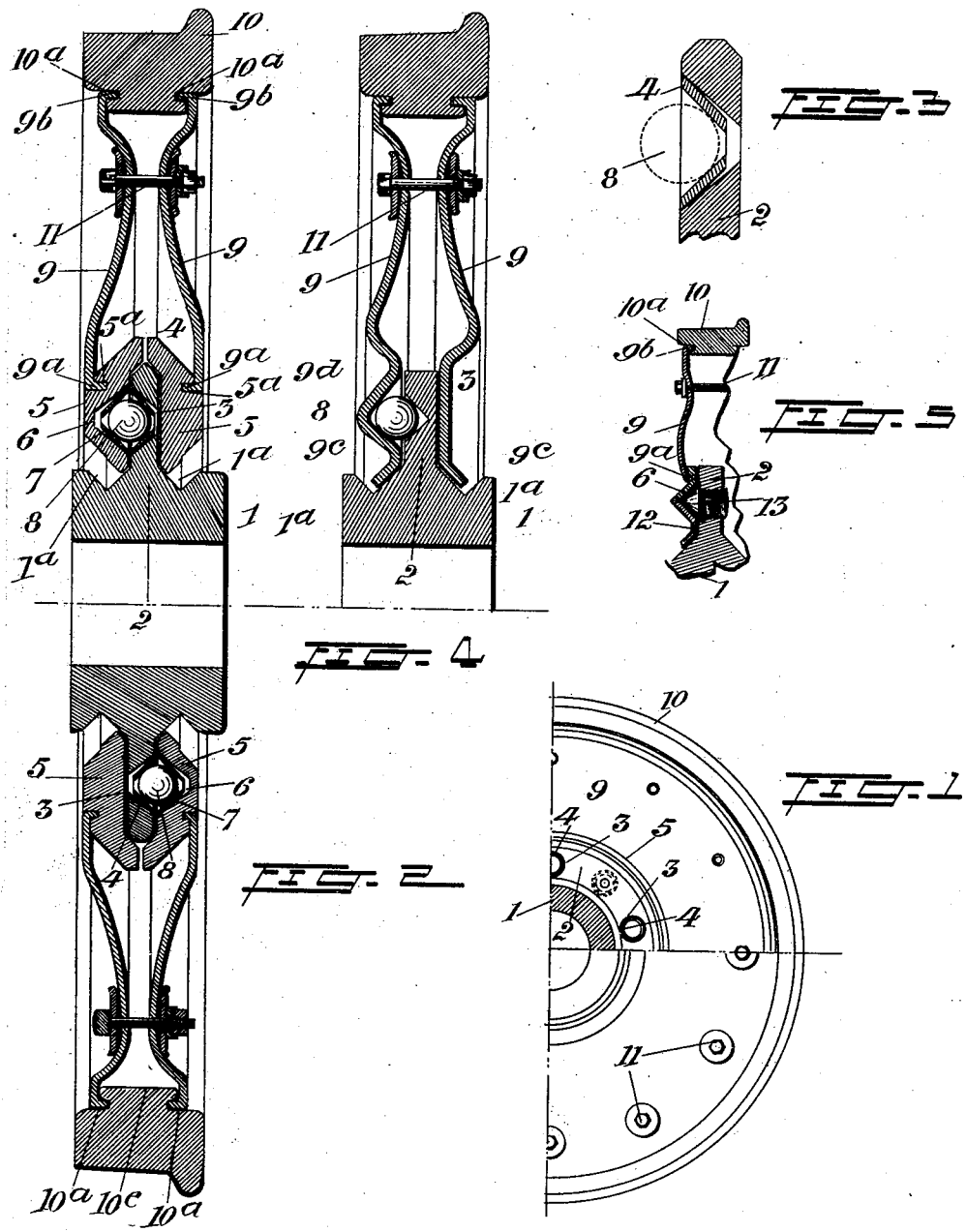

Patented December 22, 1903.

UNITED STATES PATENT OFFICE.

KARL OSKAR AHLQUIST, OF RUGBY, ENGLAND.

ELASTIC WHEEL.

SPECIFICATION forming part of Letters Patent No. 747,343, dated December 22, 1903.

Application filed June 19, 1903. Serial No. 162,213. (No model.)

*To all whom it may concern:*

Be it known that I, KARL OSKAR AHLQUIST, a subject of the King of Sweden and Norway, residing at Sunnyside, Clifton Road, Rugby, in the county of Warwick, England, have invented certain new and useful Improvements in Elastic Wheels, of which the following is a specification, such as will enable those skilled in the art to which it appertains to make and use the same.

This invention relates to elastic wheels especially designed for railway-carriages, motor-carriages, and the like; and the object thereof is to diminish as far possible the shocks and vibration to which the shafts or axles of vehicles of this class are subjected.

The invention is fully disclosed in the following specification, of which the accompanying drawings form a part, in which the separate parts of my improvement are designated by suitable reference characters in each of the views, and in which—

Figure 1 is a side elevation of one-half of a wheel made according to my invention, part thereof being broken away or in section; Fig. 2, a transverse section of said wheel; Fig. 3, a sectional view of a ball-seat which I employ and showing part of a ball-bearing; Fig. 4, a view similar to Fig. 2, but showing a modification and showing half of a cross-section of the wheel; and Fig. 5, a detail section similar to Fig. 4 and showing a modification.

In the drawings forming part of this specification, reference being made to Fig. 2, I have shown at 1 the hub of a wheel, and this hub is provided centrally with an annular flange 2, which is provided on its opposite sides with conical or cup-shaped cavities or recesses 3, which are arranged alternately, the said cavities or recesses on one side of the flange 2 being placed between those on the other side thereof, and these cavities or recesses are provided with conical or cup-shaped ball-seats 4, made of steel or other suitable metal and the inner surfaces of which form an oblique angle with the central plane of the wheel. On each side of the flange 2 is also placed a ring 5, and these rings are provided with cavities or recesses 6, similar to the cavities or recesses 3 in the flange 2 and similarly arranged, and in these cavities or recesses 6 are placed ball-seats 7, similar to the ball-seats 4, and the two seats 4 and 7 are placed opposite to each other and carry the balls 8.

The rings 5 are held in position by elastic angular metal plates 9, which may be formed of a single piece or each of which may consist of separate pieces, and which are provided at their inner edges with inwardly-directed flanges or rims $9^a$, which fit in corresponding annular grooves $5^a$ in the rings 5, and the outer edges of said plates 9 are provided with inwardly-directed annular flanges or rims $9^b$, which fit in corresponding annular grooves $10^a$ in the tire or rim 10, and the tire or rim 10 is provided with an inner annular member $10^c$, which is smaller in transverse section than the tire or rim and in which the annular grooves or recesses $10^a$ are formed.

The annular plates 9 are bent inwardly to form annular depressions or contractions therein between the hub and rim or tire, and passed through said plates at this point are bolts 11, by which said plates are securely connected, and by means of this construction the rings 5, with the ball-seats 7, are elastically supported from and by the tire 10 in such a manner that the hub 1 is securely held at the center of the wheel and said plates take up the compression stress on the tire or rim of the wheel.

There is an annular groove $1^a$ in the hub 1 at each side of the flange 2, and the side walls of which are beveled or inclined and the corresponding edges of the rings 5 are similarly formed, and the rings 5 are capable of slight movement parallel with the central plane of the wheel, and when the load on the axle exceeds a certain limit the hub presses the rings 5 sidewise and moves out from the center, the amount of this movement depending on the load or pressure applied to the tire or rim. When the load is diminished, the hub returns to its normal or center position, and when the wheel receives a shock or blow the tire, side plates 9, and rings 5 move relatively to the hub, which presses the rings 5 sidewise by means of the balls 8, said balls moving with insignificant friction on the cone or cup-shaped surfaces of their seats and carrying the hub between them in the center plane of the wheel and said balls also prevent the hub from rotating relatively to the tire or rim.

In the modification shown in Fig. 4 the side rings 5 are dispensed with and the plates 9 are made wider in cross-section or extended in the direction of the hub and inclose the flange 2, and the inner edges of the plates 9 are bent outwardly to form flanges $9^c$, which fit in the grooves $1^a$ in the hub, and in this form of construction the plates 9 are provided adjacent to their inner edges or perimeters with cavities or recesses $9^d$, similar to the cavities or recesses 6 in the rings 5 of the construction shown in Fig. 1, and the ball-seats 4 and 7 are omitted, and the operation with this form of construction will be substantially the same as with that shown in Fig. 1.

In Fig. 5 I have shown another modification, in which I substitute for the rings 5 annular rings or plates 12, in which the cavities or recesses 6 are formed, and the flange 2 of the hub 1 is provided with conical heads 13, which fit in said recesses, and it will be understood that this construction is at both sides of the flange 2 and the plate or plates 9 are provided at their inner edges with the inwardly-directed flanges or rims $9^a$, which fit in corresponding grooves in the annular plates or rings 12, and with this construction the operation will be substantially the same as that hereinbefore described, or as with the construction shown in Figs. 2 and 4.

Having fully described my invention, what I claim as new, and desire to secure by Letters Patent, is—

1. A wheel comprising a hub having a central annular flange, a rim and annular spring side plates by which the rim and hub are connected, the connection between the hub and side plates being made by means of ball-and-socket bearings, substantially as shown and described.

2. A wheel comprising a hub having a central annular flange, a rim and annular spring side plates by which the rim and hub are connected, the connection between the hub and side plates being made by means of ball-and-socket bearings, and the connection between the rim and side plates being made by means of annular grooves formed in the rim member and annular flanges formed on the side plates, substantially as shown and described.

3. A wheel comprising a hub having a central annular flange, a rim and annular spring side plates by which the rim and hub are connected, the connection between the hub and side plates being made by means of ball-and-socket bearings, and the connection between the rim and side plates being made by means of annular grooves formed in the rim member and annular flanges formed on the side plates, said side plates being also bolted together, substantially as shown and described.

4. A wheel comprising a hub having a central annular flange, rings at the opposite sides of said flange and connected therewith by ball-and-socket bearings, a rim and annular spring-plates connected with said rim and said rings, substantially as shown and described.

5. A wheel comprising a hub having a central annular flange, a rim, and annular spring side plates connecting said rim and hub, the connection between the side plates and the hub being such that said plates and hub can move relatively to each other at oblique angles within the central plane of the wheel, substantially as shown and described.

In testimony that I claim the foregoing as my invention I have signed my name, in presence of the subscribing witnesses, this 4th day of June, 1903.

KARL OSKAR AHLQUIST.

Witnesses:
 H. EMERY FULLER,
 B. RIDGWAY.